(12) United States Patent
Fukushima et al.

(10) Patent No.: US 8,195,334 B2
(45) Date of Patent: Jun. 5, 2012

(54) HAND DEVICE

(75) Inventors: Takafumi Fukushima, Wako (JP);
Hiroshi Matsuda, Wako (JP); Kenichiro Sugiyama, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 718 days.

(21) Appl. No.: 11/912,962

(22) PCT Filed: Nov. 15, 2006

(86) PCT No.: PCT/JP2006/322768
§ 371 (c)(1),
(2), (4) Date: Oct. 29, 2007

(87) PCT Pub. No.: WO2007/069424
PCT Pub. Date: Jun. 21, 2007

(65) Prior Publication Data
US 2009/0081004 A1   Mar. 26, 2009

(30) Foreign Application Priority Data
Dec. 13, 2005   (JP) .................... 2005-358455

(51) Int. Cl.
*B25J 13/08* (2006.01)
*B25J 15/10* (2006.01)
*B25J 13/00* (2006.01)
*G05B 15/00* (2006.01)
(52) U.S. Cl. ........ 700/260; 700/245; 700/258; 700/261
(58) Field of Classification Search .................. 294/106;
414/2; 700/245–264; 901/1, 31
See application file for complete search history.

(56) References Cited

U.S. PATENT DOCUMENTS

| | | | | |
|---|---|---|---|---|
| 4,980,626 A * | 12/1990 | Hess et al. | ............... | 318/568.16 |
| 5,200,679 A * | 4/1993 | Graham | .................. | 318/568.16 |
| 5,373,747 A | 12/1994 | Ogawa et al. | | |
| 5,447,403 A * | 9/1995 | Engler, Jr. | .................. | 414/4 |
| 5,501,498 A * | 3/1996 | Ulrich | ................... | 294/106 |
| 5,570,920 A * | 11/1996 | Crisman et al. | ............... | 294/111 |
| 5,762,390 A * | 6/1998 | Gosselin et al. | ............. | 294/106 |
| 2004/0103740 A1 * | 6/2004 | Townsend et al. | ......... | 74/490.01 |
| 2004/0217612 A1 | 11/2004 | Slettedal | | |
| 2005/0040663 A1 * | 2/2005 | Kameda et al. | ............... | 294/106 |
| 2005/0040664 A1 * | 2/2005 | Kameda et al. | ............... | 294/106 |
| 2006/0012197 A1 * | 1/2006 | Anderson et al. | ............. | 294/106 |
| 2006/0158146 A1 * | 7/2006 | Tadano | ................... | 318/568.21 |
| 2007/0236162 A1 * | 10/2007 | Kawabuchi et al. | ..... | 318/568.16 |
| 2009/0015026 A1 * | 1/2009 | Matsuda et al. | ............... | 294/106 |

(Continued)

FOREIGN PATENT DOCUMENTS

EP   1 142 675   10/2001

(Continued)

*Primary Examiner* — Khoi Tran
*Assistant Examiner* — Dale Moyer
(74) *Attorney, Agent, or Firm* — Rankin, Hill & Clark LLP

(57) ABSTRACT

A hand device (1) of the present invention includes a palm (10) and a plurality of finger mechanisms (11-15). The palm (10) is provided with a palm protruding portion (101-103) that protrudes upward from a palm surface region (100) when the palm surface region (100) faces upward. Accordingly, a reaction force against the force acting on an object to be grasped from an inner side of part or all of the finger mechanisms (11-15) can be exerted on the object from the protruding portion (101-103).

13 Claims, 10 Drawing Sheets

U.S. PATENT DOCUMENTS

2010/0139437 A1 * 6/2010 Ichikawa et al. ........... 74/490.05

FOREIGN PATENT DOCUMENTS

| | | |
|---|---|---|
| JP | 60-146695 | 8/1985 |
| JP | 63-251186 | 10/1988 |
| JP | 9-029675 | 2/1997 |
| JP | 9-150384 | 6/1997 |
| JP | 10-249773 | 9/1998 |
| JP | 2001-347482 | 12/2001 |
| JP | 2003-181787 | 7/2003 |
| JP | 2004-276215 | 10/2004 |
| WO | 2004/028753 | 4/2004 |
| WO | 2005/099417 | 10/2005 |

* cited by examiner

HAND DEVICE

TECHNICAL FIELD

The present invention relates to a hand device capable of grasping an object with a plurality of finger mechanisms extended from a palm.

BACKGROUND ART

There has conventionally been proposed a hand device provided with a plurality of bendable and stretchable finger mechanisms extended from a palm, like a hand of a human being (see, for example, Japanese Patent Laid-Open No. 2001-347482).

DISCLOSURE OF THE INVENTION

Problems to be Solved by the Invention

The hand device, however, somewhat lacks such flexibility as in the human hand. Thus, if it is tried to increase the force to bend the fingers to firmly grasp an object, the posture of the object may be unstable or the object may even escape from the palm.

In view of the foregoing, an object of the present invention is to provide a hand device capable of grasping an object more stably by preventing the above-described escape of the object from the palm.

Means for Solving the Problems

To accomplish the above object, according to the present invention, there is provided a hand device which includes a palm and a plurality of finger mechanisms extended from the palm, a control unit adjusting power transmitted from a power source via a power transmission mechanism to each of the finger mechanisms to control bending and stretching motions of the corresponding finger mechanism, the plurality of finger mechanisms being bent inwardly to grasp an object with the plurality of finger mechanisms and the palm, wherein the hand device includes one or both of a palm protruding portion and a finger protruding portion, the palm protruding portion protruding upward from a palm surface region when the palm is positioned so that the palm surface region faces upward, and the finger protruding portion being provided for a part or all of the plurality of finger mechanisms to protrude inwardly thereof.

According to the hand device of the present invention, the reaction force against the force acting on an object to be grasped from the inner side of part or all of the plurality of finger mechanisms can be exerted on the object from part or all of the palm protruding portion and the finger protruding portions. Accordingly, compared to the case where the palm is not provided with the protruding portions, the bending forces of the finger mechanisms can be enhanced while restricting the object from escaping from the palm, whereby the object can be grasped stably by the hand device with a strong grip. It is noted that the "palm surface region" is formed by one or both of a flat surface and a curved surface smoothly continuing therefrom.

Further, the hand device of the present invention is characterized in that the palm is provided with a bank as the palm protruding portion that partially surrounds the palm surface region.

According to the hand device of the present invention, the reaction force against the force the object receives from the finger mechanisms as described above is exerted on the object from the bank serving as the palm protruding portion, which ensures stable grasping of the object. Further, in the case where the object is of a size that can be fitted in the range of the palm surface region, the bank restricts the object from escaping from the palm surface region, which ensures stable grasping of the object.

Further, the hand device of the present invention is characterized in that the finger protruding portion is provided on an inner side of a root portion of the part or all of the plurality of finger mechanisms.

According to the hand device of the present invention, the reaction force against the force the object receives from the finger mechanisms as described above is exerted on the object from the finger protruding portion provided on the inner side of the root portion of the finger mechanism, which ensures stable grasping of the object.

Further, the hand device of the present invention is characterized in that it includes, as the plurality of finger mechanisms, a first finger mechanism and second through n-th finger mechanisms (n=3, 4, 5, . . . ) arranged in parallel, having their inner sides facing each other with the palm surface region being sandwiched therebetween, and that the palm protruding portion is provided in the palm at a part or all of respective base portions of the first, second and n-th finger mechanisms.

According to the hand device of the present invention, the arrangement, shape, function and the like of each finger mechanism can be set by associating the first finger mechanism with the thumb of the human hand, and the second through n-th finger mechanisms with the index finger and other fingers of the human hand except the thumb. Accordingly, it is possible to provide the hand device with the shape, function and others suitable for a hand device of a humanoid robot.

Further, the hand device of the present invention is characterized in that the palm protruding portion is formed with a palm element independent of the palm, and that the power transmitted from the power source to the palm element is adjusted by the control unit so as to control one or both of a protruding position and a protruding amount of the palm protruding portion protruding upward from the palm surface region when the palm surface region faces upward.

According to the hand device of the present invention, the protruding position and the protruding amount of the palm protruding portion can be controlled so that an appropriate force against the force acting on the object from the finger mechanisms can be exerted on the object from the palm protruding portion, from the standpoint of stable grasping of the object.

Further, the hand device of the present invention is characterized in that the power transmitted from the power source to the palm element is adjusted by the control unit so as to cause the palm element to swing toward and away from the palm surface region.

According to the hand device of the present invention, the palm element can be made to swing toward or away from the palm surface region in cooperation with the stretching and bending motions of the finger mechanisms, which ensures appropriate control of the protruding position and the protruding amount of the palm protruding portion in accordance with the shape and the like of the object to be grasped.

Further, the hand device of the present invention is characterized in that the finger protruding portion is formed with an element independent of the finger mechanism, and that the power transmitted from the power source to the element is adjusted by the control unit so as to control one or both of a protruding position and a protruding amount of the finger protruding portion on the inner side of the finger mechanism.

According to the hand device of the present invention, the protruding position and/or the protruding amount of the finger protruding portion provided at the finger mechanism can be controlled so that an appropriate force can be exerted on the object from the finger protruding portion against the force acting on the object from the palm protruding portion at the palm and the other finger mechanisms, from the standpoint of stable grasping of the object.

Further, the hand device of the present invention is characterized in that it includes a force sensor to output a signal corresponding to an external force acting on the palm protruding portion, and that the control unit adjusts the power transmitted from the power source to each of the finger mechanisms in accordance with the signal output from the force sensor.

According to the hand device of the present invention, the force acting on the object from the respective finger mechanisms can be controlled appropriately, from the standpoint of stable grasping of the object, in accordance with the degree of abutment (degree of contact) of the object against the palm protruding portion provided at the palm.

Further, the hand device of the present invention is characterized in that the control unit adjusts the power transmitted from the power source to the finger mechanism having the inner side facing the palm protruding portion, in accordance with the output from the force sensor provided at the palm protruding portion.

According to the hand device of the present invention, it is possible to appropriately control the force exerted on the object from one of the plurality of finger mechanisms having its inner side facing the palm protruding portion provided at the palm, in accordance with the degree of abutment (degree of contact) of the object against the palm protruding portion, from the standpoint of stable grasping of the object.

Further, the hand device of the present invention is characterized in that it includes another force sensor provided on the inner side of the finger mechanism that faces the palm protruding portion provided with the force sensor, and that the control unit detects a pattern in change over time of the outputs from the force sensors provided at the palm protruding portion and on the inner side of the finger mechanism, and adjusts the power transmitted from the power source to each of the finger mechanisms by changing the power over time in accordance with the detected result.

According to the hand device of the present invention, it is possible to readjust the grasping of the object by changing, e.g., the posture of part or all of the plurality of finger mechanisms and the palm as required, based on the timing relation in contact with the object to be grasped of the inner sides of the finger mechanisms and the protruding portions in the palm facing each other. Accordingly, in the state where it is highly likely that the hand device will fail to grasp the object, the grasping manner of the object by the hand device can be changed to ensure stable grasping of the object.

Further, the hand device of the present invention is characterized in that the power source is arranged in a portion of a space inside the palm that is created with formation of the palm protruding portion and that is greater in size than a portion of the space corresponding to the palm surface region.

According to the hand device of the present invention, the inner space of the palm created by formation of the palm protruding portion can be used effectively as the space for arranging the power source that transmits power to part or all of the plurality of finger mechanisms. Further, the inner space of the palm at the portion corresponding to the palm protruding portion is greater in size than the inner space of the palm at the portion corresponding to the palm surface region, and accordingly, the power source of a greater size can be built in the palm, which ensures enhancement of the power transmitted from the power source to the finger mechanism and, hence, the grip of the hand device.

Furthermore, in the case where the power source arranged in the inner space of the palm at the portion corresponding to the palm protruding portion is for transmitting power to any finger mechanism having its inner side facing the palm protruding portion, the hand device can grasp the object more stably by the synergetic effect of: (1) enhancement of the bending force of the finger mechanism with an increase in size of the power source as described above; and (2) the reaction force exerted on the object to be grasped from the palm protruding portion against the force acting on the object from the finger mechanism as also described above.

Further, the hand device of the present invention is characterized in that the control unit is arranged in a portion of a space inside the palm that is created with formation of the palm protruding portion and that is greater in size than a portion of the space corresponding to the palm surface region.

According to the hand device of the present invention, the inner space of the palm created by formation of the palm protruding portion can be used effectively as the space for arranging the control unit for controlling the bending and stretching motions of the plurality of finger mechanisms. Further, since the inner space of the palm at the palm protruding portion is larger than the inner space of the palm at the palm surface region, a larger wiring space can be secured for control signal lines and electric wires around the control unit.

BEST MODE FOR CARRYING OUT THE INVENTION

An embodiment of the hand device of the present invention will now be described with reference to the drawings.

Figure 1:
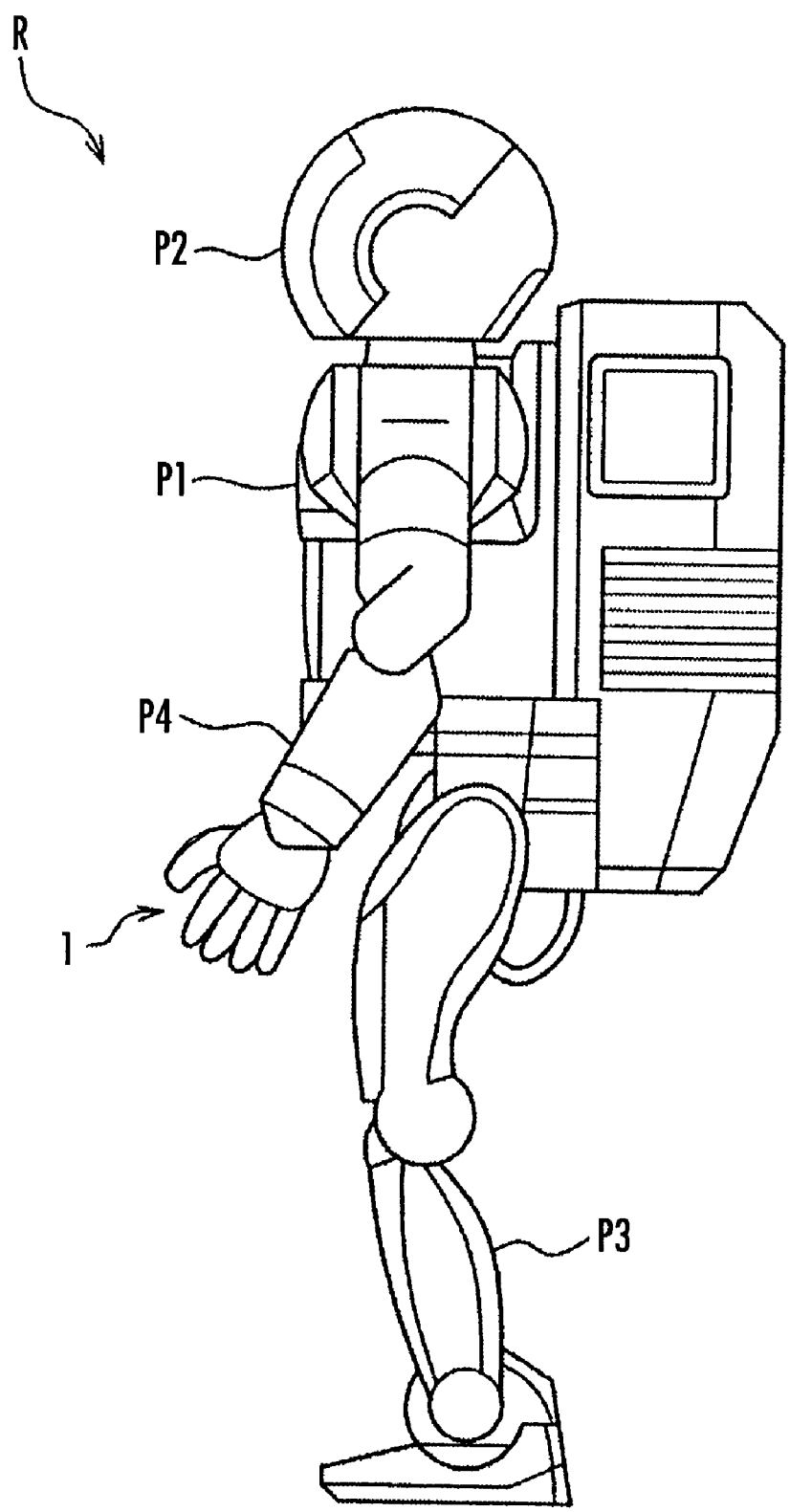
FIG. 1 is a diagram showing by way of example a configuration of a robot provided with a hand device of the present invention.

The robot R shown in FIG. 1 includes, similarly to a human being, a body P1, a head P2 provided on top of the body P1, left and right legs P3 extended downward from a lower part of the body P1, left and right arms P4 extended from the respective sides of an upper part of the body P1, and hand devices 1 provided respectively at ends of the left and right arms P4. The robot R is a biped robot capable of walking autonomously with movement of the left and right legs P3.

Firstly, a first example of the hand device 1 will be described with reference to FIGS. 2-4.

Figure 2:
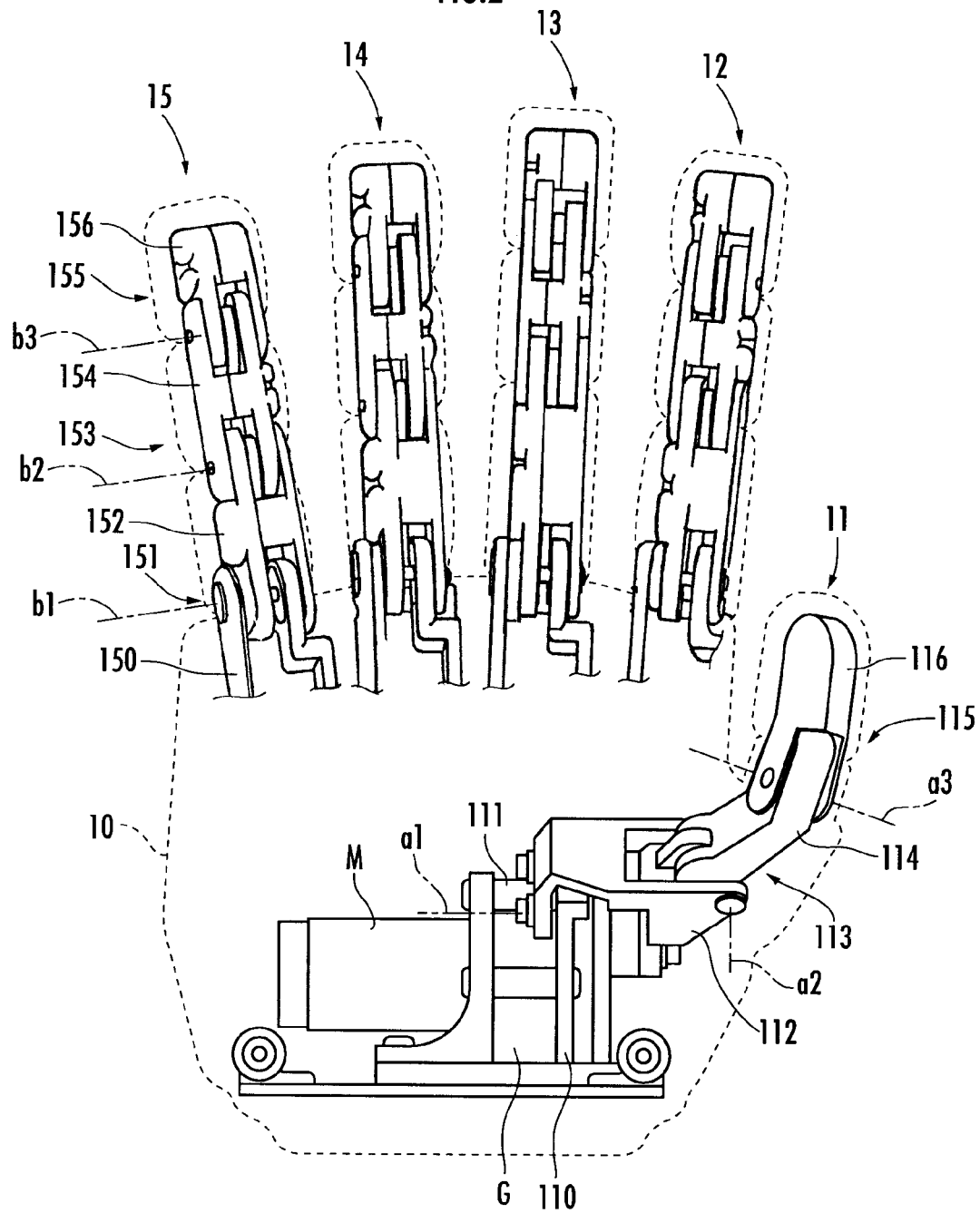
FIG. 2 is a diagram illustrating a configuration of the hand device (first example) of the present invention.

The hand device 1 of the first example, shown in FIG. 2, includes a palm 10, and a first finger mechanism 11, a second finger mechanism 12, a third finger mechanism 13, a fourth finger mechanism 14, and a fifth finger mechanism 15, extended from the palm 10. The first finger mechanism 11, the second finger mechanism 12, the third finger mechanism 13, the fourth finger mechanism 14, and the fifth finger mechanism 15 correspond to the thumb, index finger, middle finger, ring finger, and little finger, respectively, of the human hand. The first finger mechanism 11 is arranged such that its inner side can face the inner sides of the other finger mechanisms 12-15. The four finger mechanisms 12-15 are arranged in parallel in the lateral direction.

The first finger mechanism 11 has a first link element 112, a second link element 114, a third link element 116, and a finger cover of a shape as indicated by a broken line. The first link element 112, the second link element 114, and the third link element 116 correspond respectively to the first metacarpal bone, and the proximal phalanx and the distal phalanx of the thumb of the human hand. The first link element 112 is joined via a first joint 111 to a base 110 mounted to the palm 10 in a state rotatable about a first axis a1 with respect to the base 110. The base 110 may be fixedly secured to the palm 10, or may be movably mounted to the palm 10. The second link element 114 is joined via a second joint 113 to the first link element 112 in a state rotatable about a second axis a2 with respect to the first link element 112. The third link element 116 is joined via a third joint 115 to the second link element 114 in a state rotatable about a third axis a3 with respect to the second link element 114. The first joint 111, the second joint 113 and the third joint 115 correspond respectively to the joint of the first metacarpal bone on the base side, and the metacarpophalangeal joint and the interphalangeal joint of the thumb of the human hand. The first axis a1 is approximately parallel to the direction in which the finger mechanisms 12-15 are arranged (the left and right direction in FIG. 2), the second axis a2 intersects with and is at a distance from the first axis a1, and the third axis a3 intersects with and is at a distance from the second axis a2.

The first finger mechanism 11 can bend at each of the first joint 111, the second joint 113 and the third joint 115, in accordance with the power transmitted from a motor M housed in the palm 10 via a power transmission mechanism configured with a speed reduction mechanism G or the like. The power transmitted from the motor M to the first finger mechanism 11 is controlled by a control unit (not shown) composed of a CPU and others.

The finger mechanisms 12-15 are approximately identical in configuration to each other, and they are similar in configuration to the finger mechanisms described, e.g., in Japanese Patent Laid-Open No. 2003-181787. For example, the fifth finger mechanism 15 has a first link element 152, a second link element 154, a third link element 156, and a finger cover of a shape as indicated by a broken line. The first link element 152, the second link element 154, and the third link element 156 correspond respectively to the proximal phalanx, the middle phalanx, and the distal phalanx of the little finger of the human hand. The first link element 152 is joined via a first joint 151 to a base 150 mounted to the palm 10 in a state rotatable about a first axis b1 with respect to the base 150. The base 150 may be fixedly secured to the palm 10, or may be movably mounted to the palm 10. The second link element 154 is joined via a second joint 153 to the first link element 152 in a state rotatable about a second axis b2 with respect to the first link element 152. The third link element 156 is joined via a third joint 155 to the second link element 154 in a state rotatable about a third axis b3 with respect to the second link element 154. The first joint 151, the second joint 153, and the third joint 155 correspond respectively to the metacarpophalangeal joint, the proximal interphalangeal joint, and the distal interphalangeal joint of the little finger of the human hand. The first axis b1, the second axis b2 and the third axis b3 are approximately parallel to the direction in which the finger mechanisms 12-15 are arranged (the left and right direction in FIG. 2). The fifth finger mechanism 15 can bend inwardly at each of the first joint 151, the second joint 153 and the third joint 155 in accordance with the power transmitted from a motor (not shown) as a power source via a power transmission mechanism. The power transmitted from the motor to the fifth finger mechanism 15 is controlled by the control unit described above, as in the case of the first finger mechanism 11.

The second finger mechanism 12, the third finger mechanism 13 and the fourth finger mechanism 14 each have a configuration similar to the above-described configuration of the fifth finger mechanism 15, and thus, description thereof will not be repeated.

It is noted that two or more finger mechanisms among the finger mechanisms 11-15 may be driven by one motor commonly provided therefor, or one finger mechanism may be driven by one motor, as in the case of the first finger mechanism 11 of the present embodiment. Further, the power transmission mechanism may be configured with wire, pulley and the like, as described in Japanese Patent Laid-Open No. 2003-181787 mentioned above, or any other configuration may be employed as long as it can transmit the power of the motor to allow bending and stretching motions of each finger mechanism.

Figure 3:
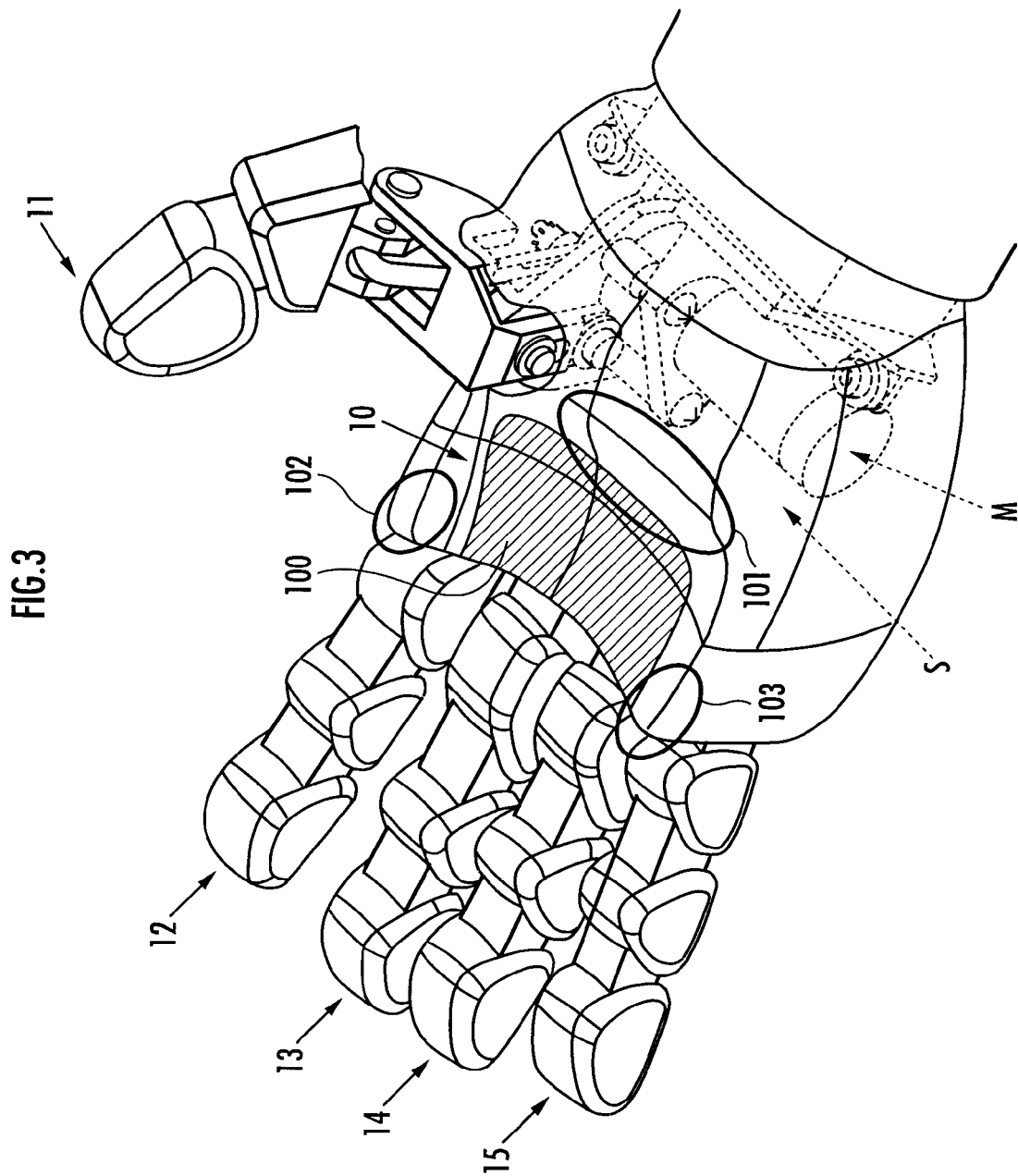
FIG. 3 is a diagram illustrating a configuration of the hand device (first example) of the present invention.

The palm 10 is structured as a casing that contains the motor M as the power source of the first finger mechanism 11 and parts of the power transmission mechanisms for the respective finger mechanisms 11-15, and it has, as shown in FIG. 3, a first palm protruding portion 101, a second palm protruding portion 102 and a third palm protruding portion 103 formed to protrude upward from a palm surface region 100 (shaded portion in the figure) when the palm surface region 100 faces upward.

The palm surface region 100 is a region of an approximately rectangular shape, which is approximately flat (having a gentle curved surface) and can face the inner sides of the finger mechanisms 11-15, and which extends laterally from near the base of the third finger mechanism 13 to near the base of the fourth finger mechanism 14 and extends vertically from near the bases to an approximately center of the palm 10.

The first palm protruding portion 101 is formed to extend from near the base of the first finger mechanism 11 in a lateral direction so as to prevent vertical expanse of the palm surface region 100 on the carpal side. The second palm protruding portion 102 is formed near the base of the second finger mechanism 12 so as to prevent lateral expanse of the palm surface region 100 on one side. The third palm protruding portion 103 is formed near the base of the fifth finger mechanism 15 so as to prevent lateral expanse of the palm surface region 100 on the other side. The palm protruding portions 101-103 constitute a bank that partially surrounds the palm surface region 100.

Further, the motor M as the power source of the first finger mechanism 11 is arranged in a space S inside the palm 10 that is created with formation of the first palm protruding portion 101 to be greater in size than a portion of the inner space corresponding to the palm surface region 100.

According to the hand device 1 of the first example structured as described above, as shown for example in FIG. 4, a reaction force (see white arrows) against the force (see black arrows) acting on an object x of a cylindrical shape from the finger mechanisms 11-15 can be exerted on the object x from the palm protruding portions 101-103. While the fourth finger mechanism 14, the fifth finger mechanism 15 and the third palm protruding portion 103 are not shown in FIG. 4, they all abut against the object x, similarly to the first finger mechanism 11, the second finger mechanism 12, the third finger mechanism 13, the first palm protruding portion 101, and the second palm protruding portion 102. Accordingly, compared to the case where the palm 10 is not provided with the palm protruding portions 101-103, it is possible to increase the bending force of each of the finger mechanisms 11-15, while preventing the object x from escaping from the palm 10, whereby the hand device 1 can grasp the object x stably with a strong grip.

Further, in the case where an object to be grasped has a size fitted in the range of the palm surface region 100, the finger mechanisms 11-15 and the three palm protruding portions 101-103 can prevent the object from escaping from the palm surface region 100, which ensures more stable grasping of the object.

Figure 4:
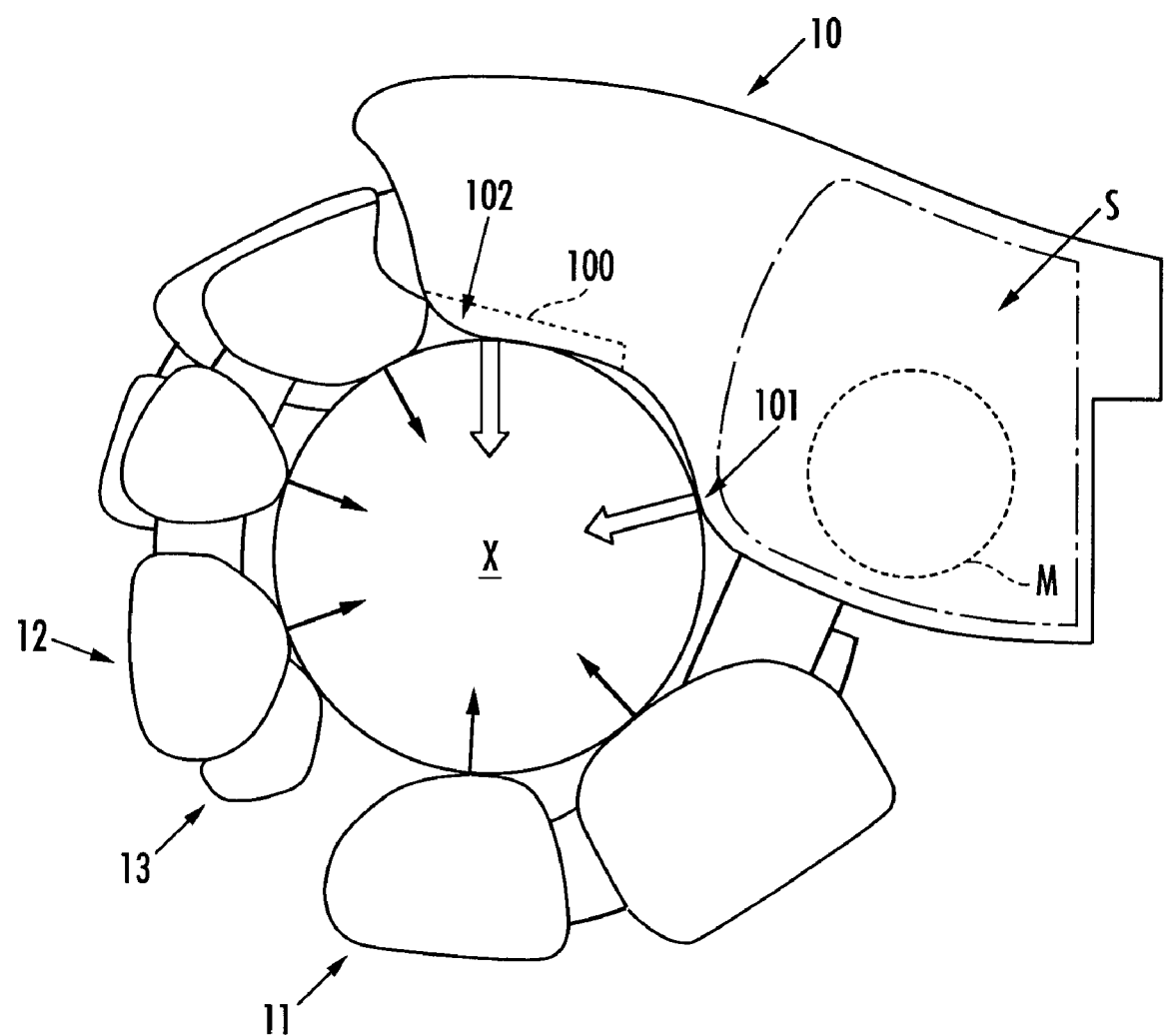
FIG. 4 is a diagram showing by way of example a state of grasping an object by the hand device (first example) of the present invention.

Furthermore, the motor M as the power source of the first finger mechanism 11 is disposed in the space S inside the palm 10 created as a result of formation of the first palm protruding portion 101 and larger than the portion of the inner space corresponding to the palm surface region 100 (see FIGS. 3 and 4). That is, the inner space S of the palm 10 can be used effectively as the space for disposing the motor M. Furthermore, since the inner space S is greater than the inner space of the palm 10 at the palm surface region 100, the motor M of a larger size can be built in the palm 10, which ensures enhancement of the power transmitted from the motor M to the first finger mechanism 11 and, hence, the grip of the hand device 1.

Figure 6:
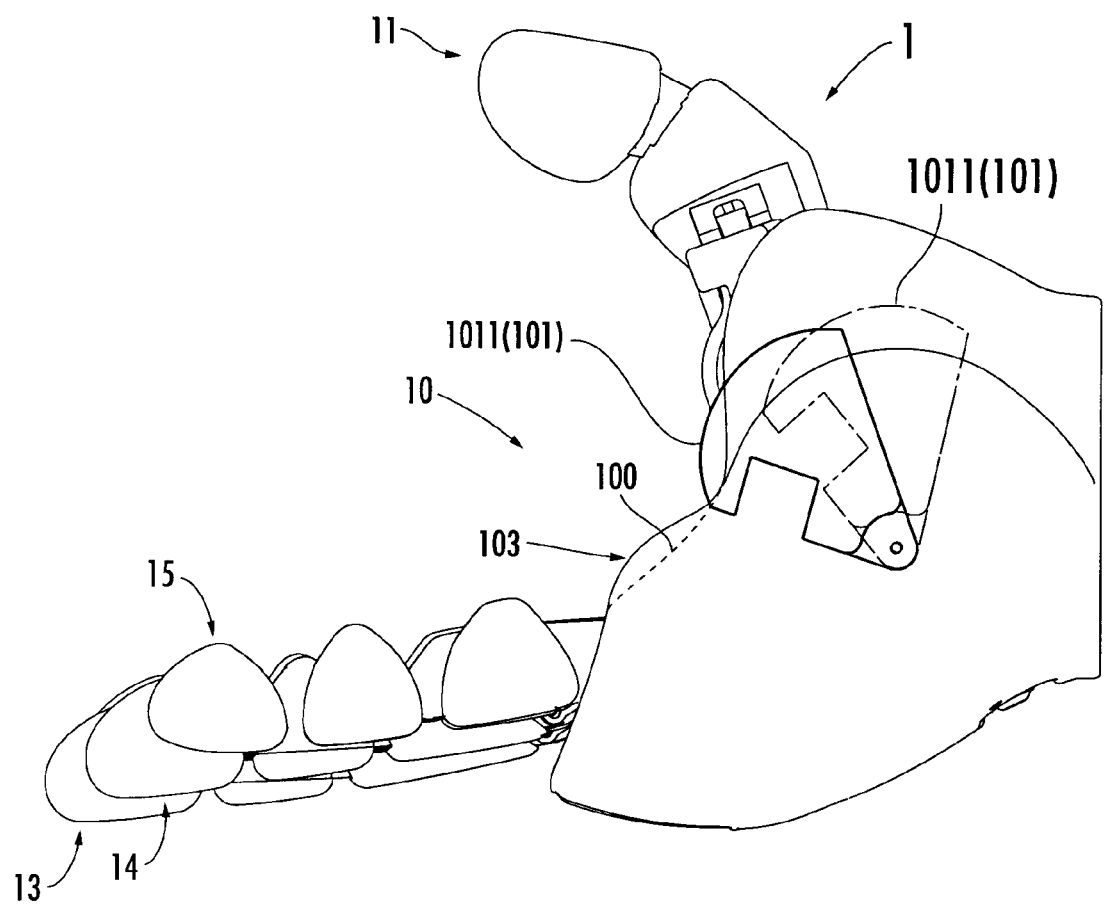
FIG. 6 is a diagram illustrating a configuration of the hand device (second example) of the present invention.
Figure 7:
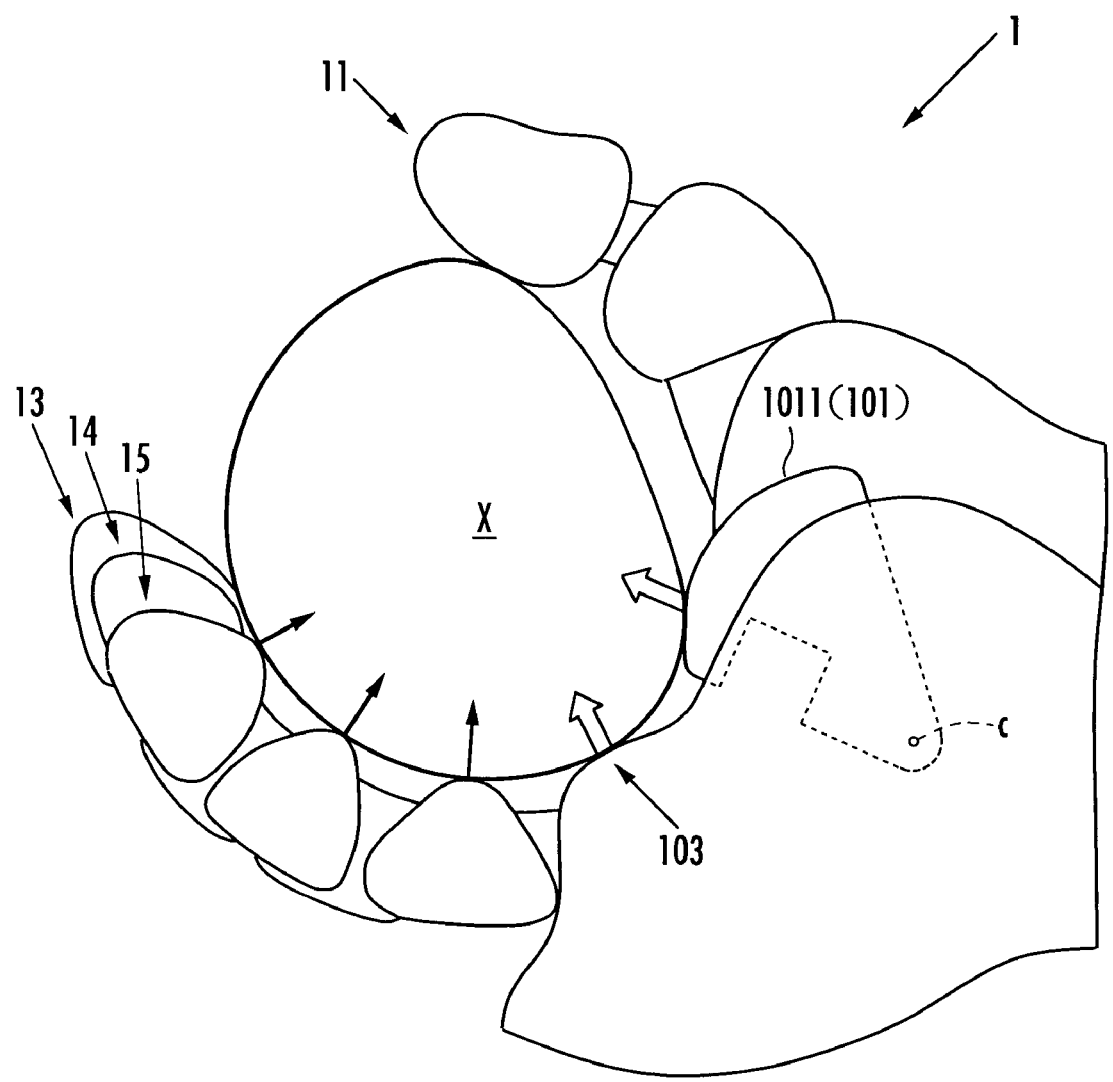
FIG. 7 is a diagram showing by way of example a state of grasping an object by the hand device (second example) of the present invention.

A second example of the hand device 1 will now be described with reference to FIGS. 5-7.

Figure 5:
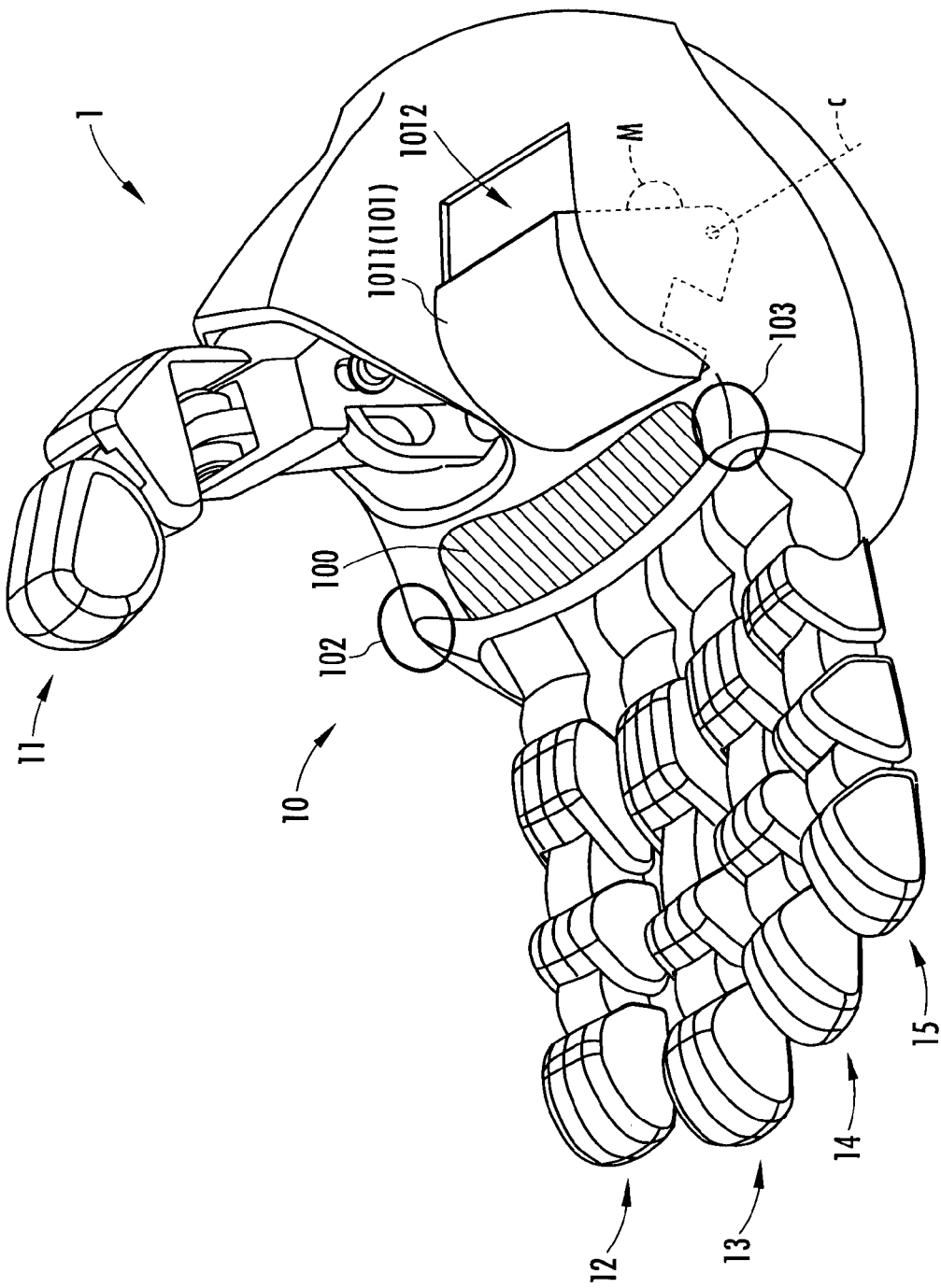
FIG. 5 is a diagram illustrating a configuration of the hand device (second example) of the present invention.

According to the hand device 1 of the second example shown in FIG. 5, a slit 1012 is provided in the palm 10 at the base portion of the first finger mechanism 11 (corresponding to the portion where the first palm protruding portion 101 is formed in the hand device 1 of the first example), and a palm element 1011 partially protruding from the palm 10 through the slit 1012 constitutes the first palm protruding portion 101. As the power is transmitted from the motor M as the power source of the first finger mechanism 11, the palm element 1011 swings along the slit 1012 about an axis c to make a transition between the state closer to the palm surface region 100, shown by a solid line in FIG. 6, and the state farther from the palm surface region 100, shown by a dashed line. The remaining configuration is approximately similar to that of the hand device of the above-described embodiment, and thus, the like reference characters are used for the common parts, and description thereof will not be repeated.

According to the hand device 1 of the second example structured as described above, as shown for example in FIG. 7, the reaction force (see the white arrows) against the force (see the black arrows) acting on the object x from the finger mechanisms 11-15 can be exerted on the object x from the palm element 1011 (=first palm protruding portion 101), the second palm protruding portion 102 and the third palm protruding portion 103. While the second finger mechanism 12 is not shown in FIG. 7, it abuts against the object x similarly to the first finger mechanism 11, the third finger mechanism 13, the fourth finger mechanism 14, the fifth finger mechanism 15, the first palm protruding portion 101, and the second palm protruding portion 102. Accordingly, compared to the case where the palm 10 is not provided with the palm protruding portions 101-103, the bending forces of the finger mechanisms 11-15 can be enhanced, while preventing the object x from escaping from the palm 10, whereby the hand device 1 can grasp the object x stably with a strong grip. In particular, since the protruding position and the protruding amount of the first palm protruding portion 101 (i.e., posture of the palm element 1011) can be controlled, it is possible to exert an appropriate force from the first palm protruding portion 101 on the object x against the force acting on the object x from the finger mechanisms 11-15, from the standpoint of stable grasping of the object x.

Figure 8:
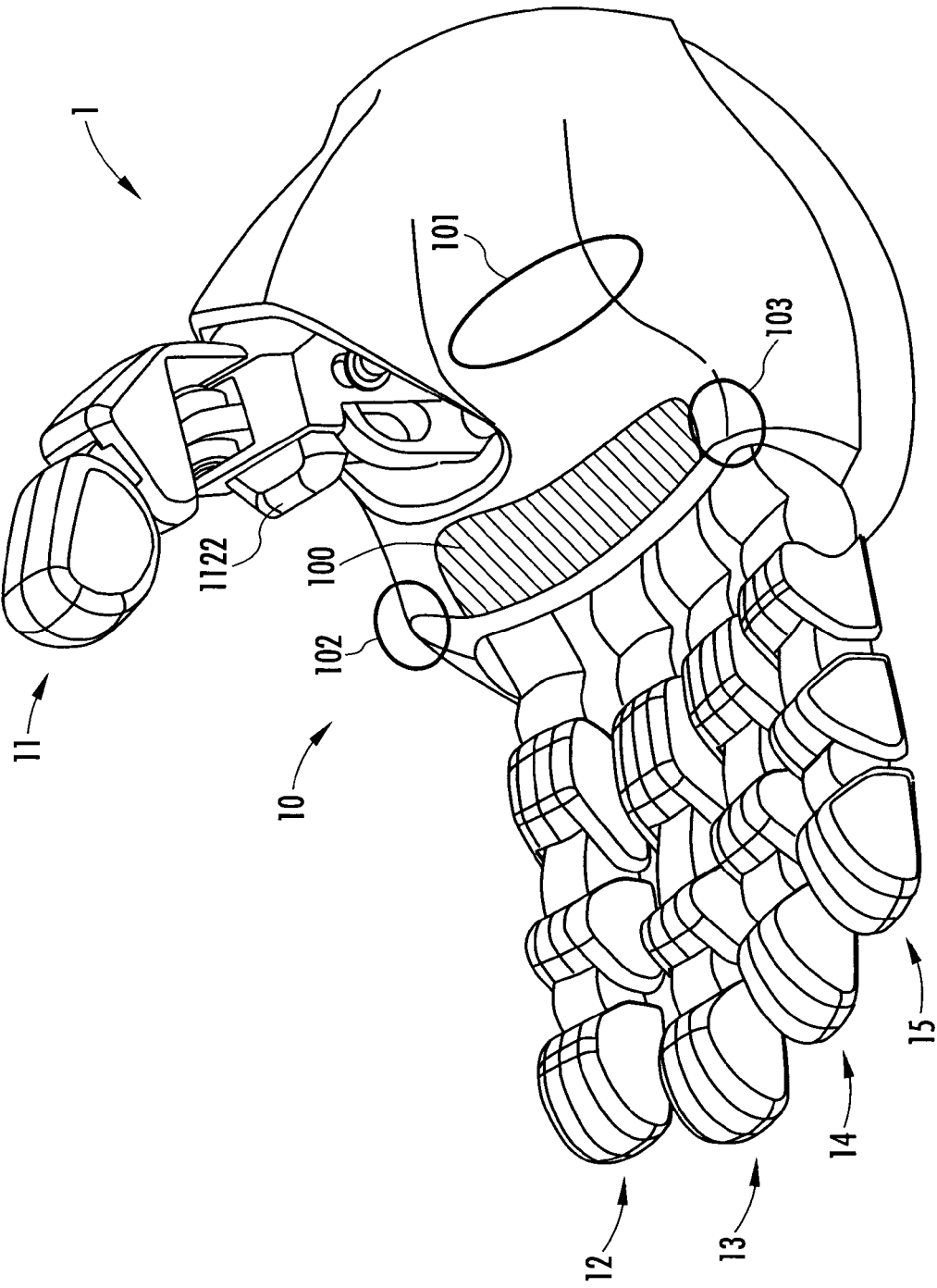
FIG. 8 is a diagram illustrating a configuration of the hand device (third example) of the present invention.

A third example of the hand device 1 will now be described with reference to FIG. 8. The hand device 1 of the third example shown in FIG. 8 has a finger protruding portion 1122 at the root portion of the first finger mechanism 11 that protrudes inwardly thereof. The remaining configuration is approximately similar to that of the hand device of the first example (FIGS. 2-4), and therefore, the like reference characters are provided to the common parts, and description thereof will not be repeated.

According to the hand device 1 of the third example structured as described above, similarly to the hand devices 1 of the first and second examples, the reaction force (see the white arrows) against the force (see the black arrows) acting on the object x from the finger mechanisms 11-15 can be exerted on the object x from the palm protruding portions 101-103. Further, a high pressure can be applied to the object x from the finger protruding portion 1122. This ensures stable grasping of the object x by the hand device 1 with a strong grip.

Figure 9:
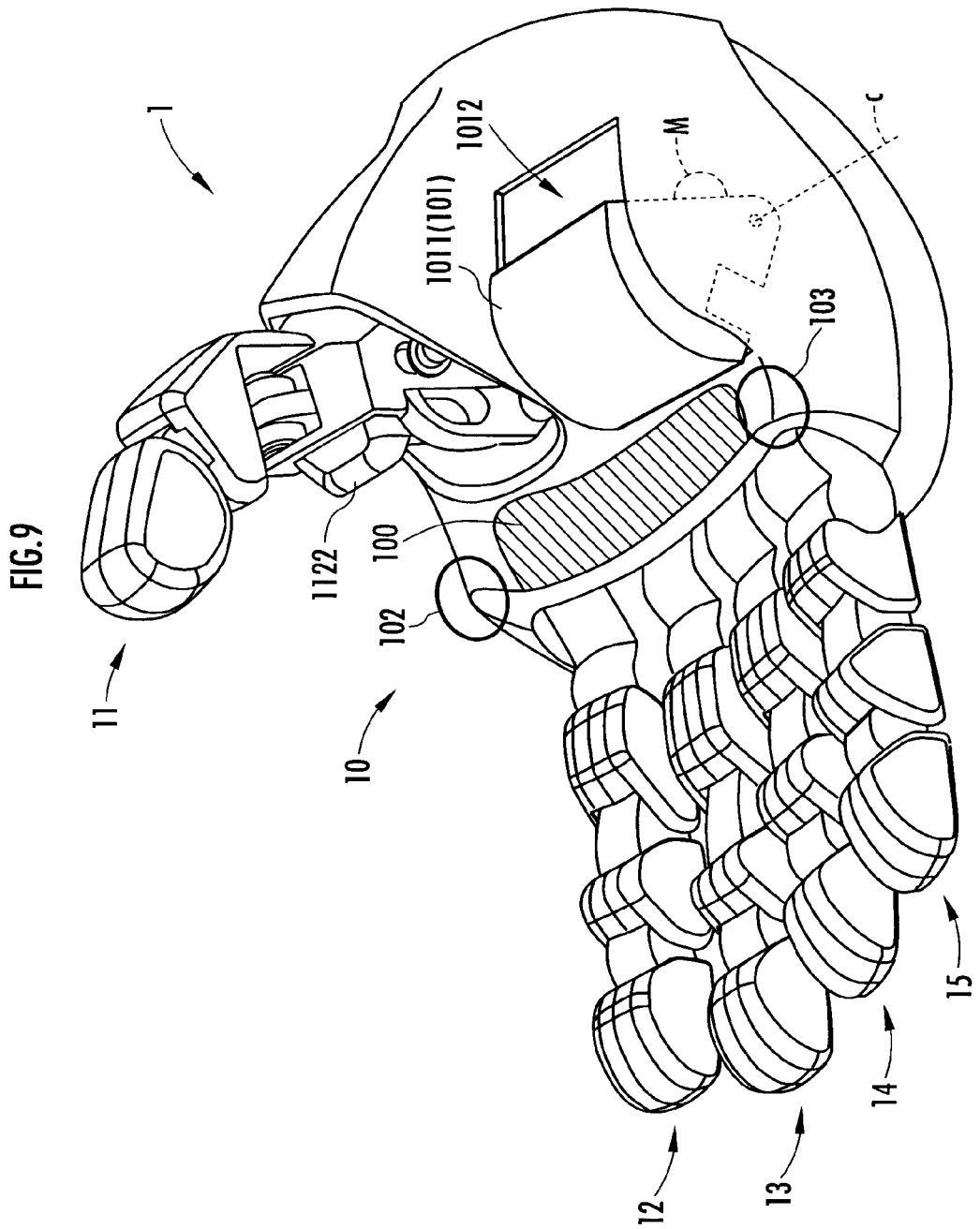
FIG. 9 is a diagram illustrating a configuration of the hand device (fourth example) of the present invention.

A fourth example of the hand device 1 will now be described with reference to FIG. 9. The hand device 1 of the fourth example shown in FIG. 9 is provided with a finger protruding portion 1122 at the root portion of the first finger mechanism 11 that protrudes inwardly thereof. The remaining configuration is approximately similar to that of the hand device of the second example (FIGS. 5-7), and therefore, the like reference characters are provided to the common parts, and description thereof will not be repeated.

According to the hand device 1 of the fourth example structured as described above, similarly to the hand devices 1 of the first and second examples, the reaction force (see the white arrows) against the force (see the black arrows) acting on the object x from the finger mechanisms 11-15 can be exerted on the object x from the palm protruding portions 101-103. Further, a high pressure can be applied to the object x from the finger protruding portion 1122. Accordingly, the object x can be grasped stably by the hand device 1 with a strong grip.

It is noted that, in the third and fourth examples, the second finger mechanism 12 and other finger mechanisms may also be provided with a finger protruding portion that protrudes inwardly. Further, the finger protruding portion protruding inwardly of the finger mechanism may be structured by a finger element independent of the finger mechanism, and the power transmitted from the motor or other power source to the finger element may be adjusted by the control unit to thereby adjust the protruding direction and the protruding amount of the finger element.

Figure 10:
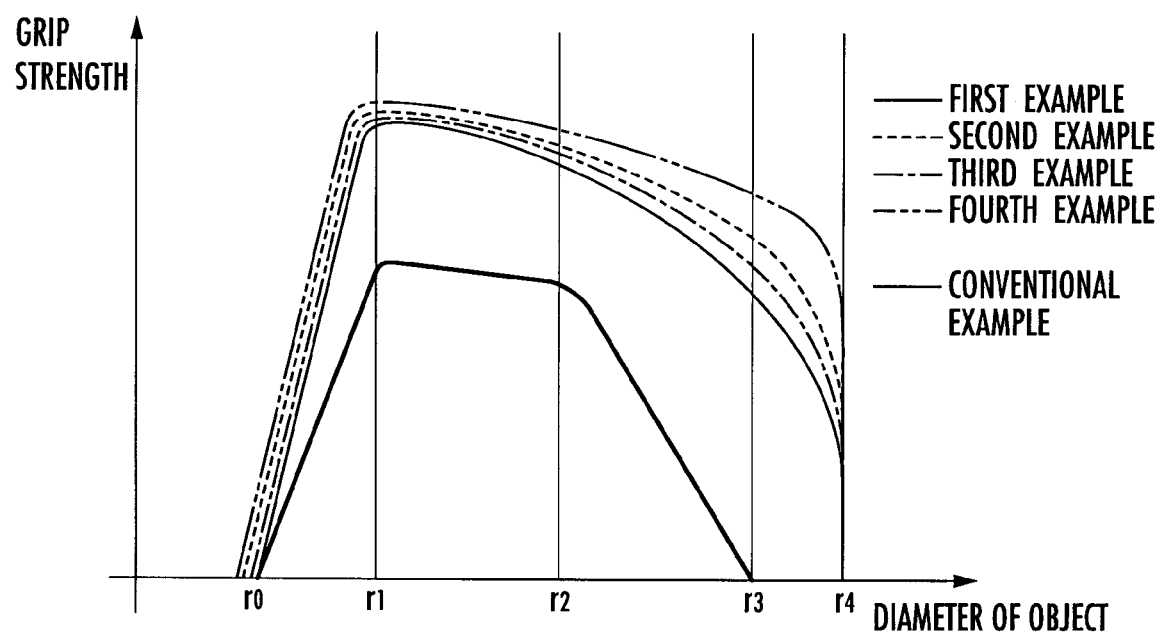
FIG. 10 is a diagram illustrating a function of the hand device of the present invention and a diagram showing by way of example a configuration of the hand device of the present invention.

Experimental results regarding the capability of grasping an object of the hand devices 1 of the first through fourth examples are shown in FIG. 10.

In FIG. 10, the horizontal axis represents a diameter of the cylindrical object that is to be grasped, and the vertical axis represents a grip strength of the hand device 1, which is measured based on the current of the motor as the power source of the finger mechanisms 11-15, the output of a pressure sensor provided at the palm 10, and the like. The capability of grasping an object by a conventional hand device, not provided with the palm protruding portions 101-103 at the palm 10, and not provided with the finger protruding portion 1122 in any of the finger mechanisms 11-15, is shown by a heavy line in FIG. 10.

By comparison, the hand devices 1 of the first through fourth examples each have high grasping capability exceeding that of the conventional hand device, as evident from a thin line (first example), a broken line (second example), a dashed line (third example), and a chain double-dashed line (fourth example). More specifically, according to the hand device 1 of the present invention, it is possible to grasp an object with a stronger grip than the conventional hand device (see the grip strength for the object diameters of r0 to r3). Further, according to the hand device 1 of the present invention, it is understood that it is possible to grasp a (bigger) object greater in diameter than the one that can be grasped by the conventional hand device (see the grip strength for the object diameters of r3 to r4). Still further, it is understood that the grip strength of the hand device 1 gradually increases in the following order: the first example (thin line) having (a) the palm protruding portions 101-103 provided at the palm 10; the third example (dashed line) having (a) the palm protruding portions 101-103 provided at the palm 10 and (b) the finger protruding portion 1122 provided as well; the second example (broken line) having (a) the palm protruding portions 101-103 provided at the palm 10 and (c) the palm protruding portion 101 configured with the movable palm element 1011; and the fourth example (chain double-dashed line) having (a) the palm protruding portions 101-103 provided at the palm 10, (b) the finger protruding portion 1122 provided as well, and (c) the palm protruding portion 101 configured with the movable palm element 1011.

While the hand device 1 of the above-described embodiment is provided with five finger mechanisms 11-15 equivalent to the five fingers of a human being so that it is suitable for a hand device of a humanoid robot 1, it is possible to change the number and/or arrangement of the finger mechanisms.

Further, while the motor M as the power source of the first finger mechanism 11 is disposed in the inner space S of the palm 10 at the first palm protruding portion 101 in the above-described embodiment (see FIGS. 3 and 4), according to another embodiment, the motor as the power source of part or all of the finger mechanisms 12-15 may be disposed in the inner space S.

According to the hand device 1 with such configuration, the object can be grasped by the hand device 1 more reliably by the synergetic effect of: (1) enhanced bending forces of the finger mechanisms 12-15 with the motor increased in size in accordance with the expanse of the inner space S; and (2) the reaction force exerted on an object to be grasped from the first palm protruding portion 101 against the force acting on the object from the finger mechanisms 12-15.

From the similar standpoint, the motor M as the power source of the first finger mechanism 11 may be disposed in the inner space of the palm 10 that is created with formation of the second palm protruding portion 102 or the third palm protruding portion 103 to be larger than the portion of the space corresponding to the palm surface region 100. This ensures that the hand device 1 can grasp the object more reliably by the synergetic effect of: (1) enhanced bending force of the first finger mechanism 11 with the motor M increased in size in accordance with the expanse of the inner space; and (2) the reaction force exerted on an object to be grasped from one or both of the second palm protruding portion 102 and the third palm protruding portion 103 against the force acting on the object from the first finger mechanism 11.

Further, the control unit described above, for controlling bending and stretching motions of part or all of the finger mechanisms 11-15, may be arranged in the inner space of the palm 10 corresponding to the first palm protruding portion 101, the second palm protruding portion 102 or the third palm protruding portion 103 that is larger than the space corresponding to the palm surface region 100.

According to the hand device 1 with such configuration, the inner space S of the palm 10 can be used effectively as the space for arranging the control unit. Further, since the inner space S is larger than the inner space of the palm 10 corresponding to the palm surface region 100, a larger wiring space can be secured for the control signal lines and electric wires around the control unit.

Furthermore, the palm 10 may further be provided with a force sensor that produces an output in accordance with an external force acting on each of the palm protruding portions 101-103, and the control unit controlling the bending and stretching motions of the finger mechanisms 11-15 may adjust the power transmitted from the power source such as the motor M to each of the finger mechanisms 11-15 in accordance with the output of the force sensor.

According to the hand device 1 with such configuration, the force to be exerted on the object from the respective finger mechanisms 11-15 can be controlled appropriately in accordance with the degree of abutment (degree of contact) of the object against the palm protruding portions 101-103 provided at the palm 10, from the standpoint of stable grasping of the object. For example, in the case where the output of the force sensor is based on the contact between the palm 10 and the object at the first palm protruding portion 101, the force of bending the finger mechanisms 12-15, having their inner sides facing the first palm protruding portion 101, may be increased (see FIG. 4). In the case where the output of the force sensor is based on the contact between the palm 10 and the object at the second palm protruding portion 102 or the third palm protruding portion 103, the force bending the first finger mechanism 11, having the inner side facing the second palm protruding portion 102 or the third palm protruding portion 103, may be increased (ditto).

Still further, the force sensors may be provided, not only at the palm protruding portions 101-103, but also at the inner sides of the finger mechanisms 11-15 facing them, and the control unit may detect a pattern in change over time of the outputs from the force sensors provided at the palm protruding portions 101-103 and the inner sides of the finger mechanisms 11-15, to adjust the power transmitted from the motor M and other power sources to the respective finger mechanisms 11-15 such that they change over time in response to the detected results.

According to the hand device 1 with such configuration, it is possible to readjust grasping of the object by changing, e.g., the posture of part or all of the finger mechanisms 11-15 and the palm 10 as required, based on the timing relation in contact with the object to be grasped of the inner sides of the finger mechanisms 11-15 and the palm protruding portions 101-103 of the palm 10 facing each other. Accordingly, in the state where it is highly likely that the hand device will fail to grasp the object, the grasping manner of the object by the hand device 1 can be changed to ensure stable grasping of the object.

The invention claimed is:

1. A hand device including
a palm;
a plurality of finger mechanisms extending from the palm;
a control unit to adjust power transmitted from a power source via a power transmission mechanism to each of the plurality of finger mechanisms to control bending and stretching motions of the corresponding finger mechanism;
a first palm protruding portion protruding upward from a palm surface region when the palm is positioned so that the palm surface region faces upward;
a finger protruding portion provided on at least one of the plurality of finger mechanisms and protruding inwardly therefrom;
one or more actuators to drive the plurality of finger mechanisms from a straightened position to a bent position to grasp an object with the palm; and
a first force sensor provided at the first palm protruding portion to output a signal corresponding to an external force acting on the first palm protruding portion;
a second force sensor, provided on the inner side of the plurality of finger mechanisms that face the first palm protruding portion provided with the first force sensor, to output a signal corresponding to an external force acting on the inner side of the plurality of finger mechanisms,
wherein the control unit detects a pattern in change over time of the signals output from the first force sensor and the second force sensor, and adjusts the power transmitted from the power source to each of the plurality of finger mechanisms by changing the power over time in accordance with the detected result, and
wherein the control unit adjusts the power transmitted from the power source to the plurality of finger mechanisms having the inner side facing the first palm protruding portion, in accordance with the signal output from the first force sensor and the second force sensor.

2. The hand device according to claim 1 further comprising a second palm protruding portion protruding upward from the palm surface region when the palm is positioned so that the palm surface region faces upward, said second palm protruding portion being spaced from said first palm protruding portion by the palm surface; and
a third palm protruding portion protruding upward from the palm surface region when the palm is positioned so that the palm surface region faces upward, said third palm protruding portion being spaced from said first palm protruding portion and said second palm protruding portion by the palm surface,
wherein the first palm protruding portion, the second palm protruding portion, and the third palm protruding portion form a bank that partially surrounds the palm surface region.

3. The hand device according to claim 1, wherein the finger protruding portion is provided on an inner side of a root portion of the at least one plurality of finger mechanisms.

4. The hand device according to claim 2, wherein the plurality of finger mechanisms include a first finger mechanism, a second finger mechanism, a third finger mechanism, a fourth finger mechanism, and a fifth finger mechanism arranged in parallel, having their inner sides facing each other with the palm surface region being sandwiched therebetween, wherein the first palm protruding portion is provided in the palm at a base of the first finger mechanism, the second palm protruding portion is provided in the palm at a base of the second finger mechanism, and the third palm protruding portion is provided in the palm at a base of the fifth finger mechanism.

5. The hand device according to claim 1, wherein the first palm protruding portion includes a palm element independent of the palm, said palm element being movable in a direction toward and away from a point of connection between at least some of the plurality of finger mechanisms and the palm, and in a direction of increasing/decreasing projection from the palm surface region, said palm element being movable between a first position and a second position, said first position being closer to said point of connection and further protruded from the palm than said second position; and
wherein the control unit adjusts the power transmitted from the power source to the palm element to control movement of the palm element in accordance with the signal output from the force sensor provided at the first palm protruding portion.

6. The hand device according to claim 5, wherein the power transmitted from the power source to the palm element is adjusted by the control unit so that the palm element swings toward and away from the palm surface region.

7. The hand device according to claim 1, wherein
the finger protruding portion includes an element independent of the plurality of finger mechanisms, said element provided to be independently movable relative to the finger mechanism on which the finger protruding portion is provided, and
the power transmitted from the power source to the element is adjusted by the control unit so as to control one or both of a protruding position and a protruding amount of the finger protruding portion element relative to the inner side of the finger mechanism on which the finger protruding portion is provided.

8. The hand device according to claim 1, wherein the power source is arranged in a portion of a space inside the palm that is created with formation of the first palm protruding portion and that is greater in size than a portion of the space corresponding to the palm surface region.

9. The hand device according to claim 1, wherein the control unit is arranged in a portion of a space inside the palm that is created with formation of the first palm protruding portion and that is greater in size than a portion of the space corresponding to the palm surface region.

10. The hand device according to claim 2, wherein
the finger protruding portion includes an element independent of the plurality of finger mechanisms, said element provided to be independently movable relative to the finger mechanism on which the finger protruding portion is provided, and
the power transmitted from the power source to the element is adjusted by the control unit so as to control one or both of a protruding position and a protruding amount of the finger protruding portion element relative to the inner side of the finger mechanism on which the finger protruding portion is provided.

11. The hand device according to claim 5, wherein
the finger protruding portion includes an element independent of the plurality of finger mechanisms, said element provided to be independently movable relative to the finger mechanism on which the finger protruding portion is provided, and
the power transmitted from the power source to the element is adjusted by the control unit so as to control one or both of a protruding position and a protruding amount of the finger protruding portion element relative to the inner side of the finger mechanism on which the finger protruding portion is provided.

12. The hand device according to claim 5, wherein the control unit adjusts the power transmitted from the power source to the palm element so as to control one or both of a protruding position and a protruding amount of the palm element relative to the palm in accordance with the signal output from the force sensor provided at the first palm protruding portion.

13. A hand device including
a palm having an opening;
a plurality of finger mechanisms extending from the palm;
a control unit to adjust power transmitted from a power source via a power transmission mechanism to each of the plurality of finger mechanisms to control bending and stretching motions of the corresponding finger mechanism;
a first palm protruding portion protruding upward from a palm surface region when the palm is positioned so that the palm surface region faces upward;
a finger protruding portion provided on at least one of the plurality of finger mechanisms and protruding inwardly therefrom; and
one or more actuators to drive the plurality of finger mechanisms from a straightened position to a bent position to grasp an object with the palm,
wherein the first palm protruding portion includes a palm element, the palm element being pivotally attached inside the palm and partially extending through the opening, and
wherein the palm element pivots about an axis such that the palm element moves along the opening toward the palm surface region and away from the palm surface region.

* * * * *